(12) United States Patent
Dorfner

(10) Patent No.: US 10,108,292 B2
(45) Date of Patent: Oct. 23, 2018

(54) CAPACITIVE SENSOR SYSTEM WITH MULTIPLE TRANSMIT ELECTRODES

(71) Applicant: Microchip Technology Incorporated, Chandler, AZ (US)

(72) Inventor: Andreas Dorfner, Munich (DE)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 125 days.

(21) Appl. No.: 15/134,749

(22) Filed: Apr. 21, 2016

(65) Prior Publication Data

US 2016/0313851 A1 Oct. 27, 2016

Related U.S. Application Data

(60) Provisional application No. 62/151,172, filed on Apr. 22, 2015.

(51) Int. Cl.
*G06F 3/041* (2006.01)
*G06F 3/044* (2006.01)
*G06F 3/0346* (2013.01)

(52) U.S. Cl.
CPC .......... *G06F 3/0416* (2013.01); *G06F 3/0346* (2013.01); *G06F 3/044* (2013.01);
(Continued)

(58) Field of Classification Search
CPC ................. G06F 3/044; G06F 3/0416; G06F 2203/04101; G06F 2203/04108;
(Continued)

(56) References Cited

U.S. PATENT DOCUMENTS 5,166,679 A * 11/1992 Vranish .................. B25J 13/086
324/687
5,442,347 A * 8/1995 Vranish .................. G01V 3/088
324/686

(Continued)

FOREIGN PATENT DOCUMENTS

EP         2371062 B1    1/2013    ............. E05B 65/20
WO      97/29391 A1    8/1997    ............... B01V 3/08

OTHER PUBLICATIONS

International Search Report and Written Opinion, Application No. PCT/US2016/028813, 13 pages, dated Dec. 5, 2016.

(Continued)

*Primary Examiner* — Michael J Jansen, II
(74) *Attorney, Agent, or Firm* — Slayden Grubert Beard PLLC

(57) ABSTRACT

A capacitive sensor system has a receiving electrode with a capacitive coupling to a ground plane or ground electrode, a first transmission electrode arranged between the receiving electrode and the ground plane and having a size with respect to the receiving electrode such that the transmission electrodes covers a surface area of the receiving electrode, and a second transmission electrode arranged adjacent to the receiving electrode and which is not coupled with the first transmission electrode, wherein the second transmission electrode is driven with a higher alternating voltage than the first transmission electrode.

24 Claims, 7 Drawing Sheets

(52) U.S. Cl.
CPC .............. *G06F 2203/04101* (2013.01); *G06F 2203/04107* (2013.01)

(58) Field of Classification Search
CPC ................... G06F 3/041; G06F 3/0412; G06F 2203/04107; G06F 3/0346
See application file for complete search history.

(56) References Cited

U.S. PATENT DOCUMENTS

| | | | | |
|---|---|---|---|---|
| 5,512,836 | A * | 4/1996 | Chen | G01B 7/023 324/663 |
| RE36,772 | E * | 7/2000 | Vranish | B25J 19/06 324/687 |
| 6,348,862 | B1 * | 2/2002 | McDonnell | B60N 2/002 180/272 |
| 6,859,141 | B1 * | 2/2005 | Van Schyndel | G01S 13/04 324/658 |
| 7,138,809 | B2 * | 11/2006 | Nakamura | G01V 3/088 324/681 |
| 7,548,075 | B2 * | 6/2009 | Somers | A61B 6/102 324/658 |
| 8,353,210 | B2 * | 1/2013 | Kamm | G01D 3/036 324/658 |
| 8,358,226 | B2 * | 1/2013 | Reynolds | G06F 3/0202 178/18.06 |
| 8,487,905 | B2 * | 7/2013 | Kandziora | G06F 3/0412 178/18.06 |
| 8,638,107 | B2 * | 1/2014 | Schwartz | G06F 3/0416 324/658 |
| 8,653,834 | B2 * | 2/2014 | Reynolds | G06F 3/044 324/658 |
| 8,682,949 | B2 * | 3/2014 | Matsushima | G06F 3/044 708/400 |
| 8,896,328 | B2 * | 11/2014 | Reynolds | G06F 3/044 324/686 |
| 8,988,385 | B2 * | 3/2015 | Seo | G06F 3/0416 345/174 |
| 9,110,545 | B2 * | 8/2015 | Radivojevic | G06F 3/04883 |
| 9,118,330 | B2 * | 8/2015 | Beyly | G06F 3/044 |
| 9,124,274 | B2 * | 9/2015 | Kaltner | H03K 17/962 |
| 9,151,790 | B1 * | 10/2015 | Hoshtanar | G01R 27/2605 |
| 9,166,581 | B2 * | 10/2015 | Kaltner | G06F 3/044 |
| 9,188,675 | B2 * | 11/2015 | Bulea | H03K 17/955 |
| 9,236,860 | B2 * | 1/2016 | Unterreitmayer | G06F 1/1613 |
| 9,247,504 | B2 * | 1/2016 | Erkens | H01Q 1/245 |
| 9,298,325 | B2 * | 3/2016 | Shepelev | G06F 3/044 |
| 9,298,333 | B2 * | 3/2016 | Gay | G06F 3/046 |
| 9,304,643 | B2 * | 4/2016 | Jordan | G06F 3/044 |
| 9,322,861 | B2 * | 4/2016 | Burger | G06F 1/1684 |
| 9,323,379 | B2 * | 4/2016 | Aubauer | G06F 3/0416 |
| 9,442,534 | B2 * | 9/2016 | Burger | H03K 17/955 |
| 9,459,296 | B2 * | 10/2016 | Aubauer | H03K 17/955 |
| 9,552,068 | B2 * | 1/2017 | Aubauer | G06F 3/017 |
| 9,588,629 | B2 * | 3/2017 | Jordan | G06F 3/044 |
| 9,665,204 | B2 * | 5/2017 | Heim | G06F 3/0416 |
| 9,665,725 | B2 * | 5/2017 | Curtis | G06F 3/017 |
| 9,702,902 | B2 * | 7/2017 | Burger | H05K 1/162 |
| 9,733,290 | B2 * | 8/2017 | Burger | H03K 17/955 |
| 9,733,706 | B2 * | 8/2017 | Beecher | G06F 3/044 |
| 9,753,070 | B2 * | 9/2017 | Burger | H03K 17/962 |
| 9,811,206 | B2 * | 11/2017 | Lee | G06F 3/0418 |
| 9,857,828 | B2 * | 1/2018 | Aubauer | G06F 1/16 |
| 9,921,739 | B2 * | 3/2018 | Dorfner | G06F 3/0488 |
| 9,927,926 | B2 * | 3/2018 | Peng | G06F 3/044 |
| 9,927,933 | B2 * | 3/2018 | Heim | G06F 3/017 |
| 2007/0269012 | A1 * | 11/2007 | Somers | A61B 6/102 378/117 |
| 2009/0107737 | A1 * | 4/2009 | Reynolds | G06F 3/0202 178/18.06 |
| 2009/0128374 | A1 * | 5/2009 | Reynolds | G06F 3/0202 341/33 |
| 2010/0071459 | A1 * | 3/2010 | Kamm | G01D 3/036 73/304 C |
| 2010/0110038 | A1 * | 5/2010 | Mo | G06F 3/044 345/174 |
| 2010/0292945 | A1 * | 11/2010 | Reynolds | G06F 3/044 702/65 |
| 2010/0295564 | A1 * | 11/2010 | Reynolds | G06F 3/044 324/686 |
| 2011/0055305 | A1 * | 3/2011 | Matsushima | G06F 3/0416 708/400 |
| 2011/0148435 | A1 * | 6/2011 | Schwartz | G06F 3/0416 324/658 |
| 2011/0175671 | A1 * | 7/2011 | Reynolds | G06F 3/044 327/517 |
| 2012/0026121 | A1 * | 2/2012 | Unterreitmayer | G06F 1/1613 345/174 |
| 2012/0139562 | A1 * | 6/2012 | Beyly | G06F 3/044 324/679 |
| 2013/0015868 | A1 * | 1/2013 | Peng | G06F 3/044 324/688 |
| 2013/0038570 | A1 * | 2/2013 | Seo | G06F 3/0416 345/174 |
| 2013/0106765 | A1 * | 5/2013 | Beecher | G06F 3/044 345/174 |
| 2013/0147833 | A1 * | 6/2013 | Aubauer | G06F 3/0416 345/619 |
| 2013/0162517 | A1 * | 6/2013 | Gay | G06F 3/046 345/156 |
| 2013/0187705 | A1 * | 7/2013 | Kaltner | G06F 3/044 327/517 |
| 2013/0257745 | A1 * | 10/2013 | Reynolds | G06F 3/041 345/173 |
| 2014/0049266 | A1 * | 2/2014 | Heim | G01R 35/005 324/603 |
| 2014/0049505 | A1 * | 2/2014 | Radivojevic | G06F 3/04883 345/174 |
| 2014/0055396 | A1 * | 2/2014 | Aubauer | G06F 3/017 345/173 |
| 2014/0118011 | A1 * | 5/2014 | Burger | G06F 1/1684 324/676 |
| 2014/0132287 | A1 * | 5/2014 | Reynolds | G06F 3/044 324/686 |
| 2014/0191770 | A1 * | 7/2014 | Lefebvre | G01D 5/24 324/681 |
| 2014/0267128 | A1 * | 9/2014 | Bulea | G06F 3/044 345/174 |
| 2014/0267137 | A1 * | 9/2014 | Solven | G06F 3/0416 345/174 |
| 2015/0054752 | A1 * | 2/2015 | Mackey | G06F 3/044 345/173 |
| 2015/0091587 | A1 * | 4/2015 | Shepelev | G06F 3/044 324/658 |
| 2015/0091842 | A1 * | 4/2015 | Shepelev | G06F 3/044 345/174 |
| 2015/0123682 | A1 * | 5/2015 | Burger | G06F 3/044 324/688 |
| 2015/0145814 | A1 * | 5/2015 | Burger | H03K 17/955 345/174 |
| 2015/0370364 | A1 * | 12/2015 | Jordan | G06F 3/044 345/174 |
| 2016/0011692 | A1 * | 1/2016 | Heim | G06F 3/017 345/174 |
| 2016/0041639 | A1 * | 2/2016 | Kaltner | G06F 3/044 345/173 |
| 2016/0054754 | A1 * | 2/2016 | Aubauer | G06F 1/16 345/174 |
| 2016/0054850 | A1 * | 2/2016 | Aubauer | G06F 1/16 345/174 |
| 2016/0110020 | A1 * | 4/2016 | Lee | G06F 3/0418 345/174 |
| 2016/0187450 | A1 * | 6/2016 | Heim | G01R 35/005 324/603 |
| 2016/0232364 | A1 * | 8/2016 | Curtis | G06F 3/017 |
| 2016/0313851 | A1 * | 10/2016 | Dorfner | G06F 3/0416 |
| 2016/0313852 | A1 * | 10/2016 | Dorfner | G06F 3/017 |
| 2016/0364074 | A1 * | 12/2016 | Dorfner | G06F 3/0416 |

(56) References Cited

U.S. PATENT DOCUMENTS

2017/0102815 A1* 4/2017 Portmann ............... G01L 1/146
2017/0212599 A1* 7/2017 Sharma ................... G06F 3/017

OTHER PUBLICATIONS

"MGC3130: Sabrewing Single-Zone Evaluation Kit User's Guide," Microchip Technology Incorporated, 34 pages, © 2013.

* cited by examiner

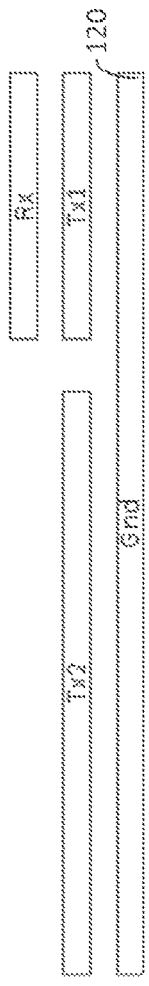
*Figure 6*
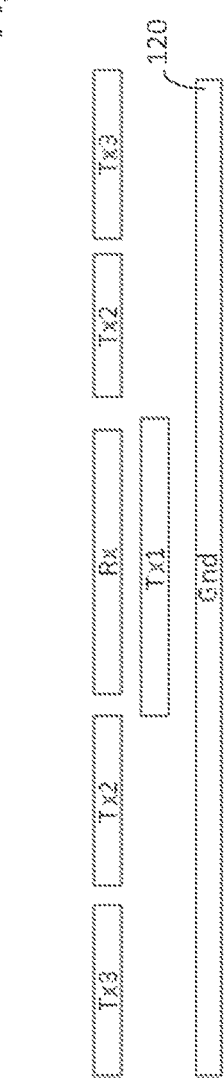
*Figure 7a*
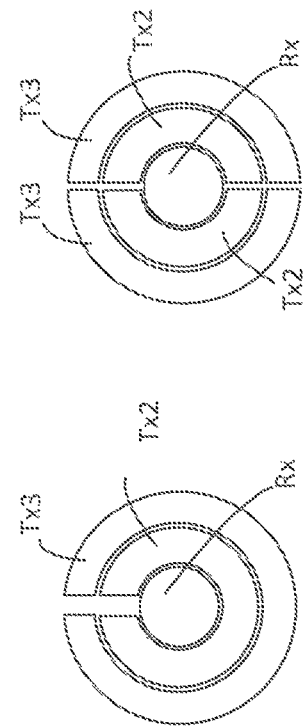
*Figure 7b*     *Figure 7c*     *Figure 7d*

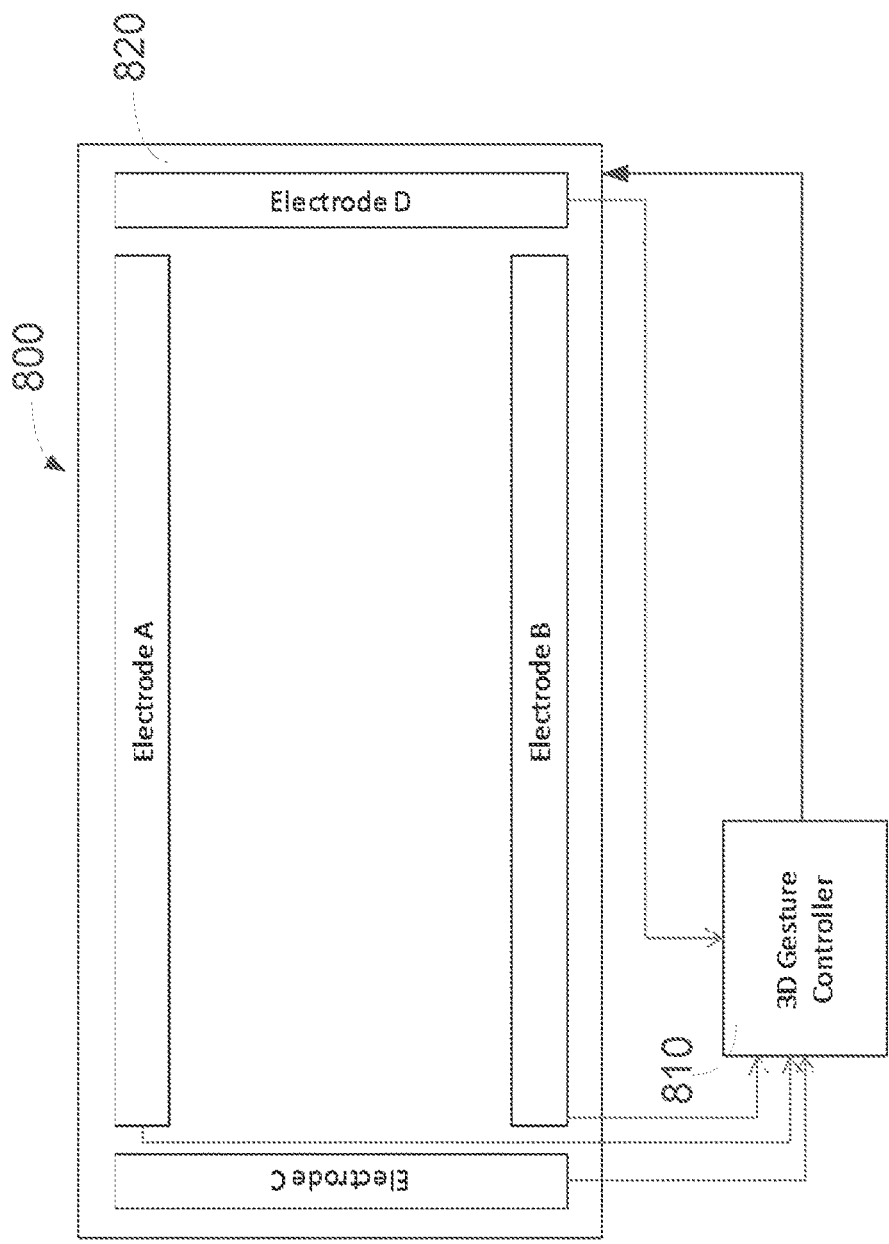

CAPACITIVE SENSOR SYSTEM WITH MULTIPLE TRANSMIT ELECTRODES

RELATED PATENT APPLICATION

This application claims priority to commonly owned U.S. Provisional Patent Application No. 62/151,172, filed Apr. 22, 2015, which is hereby incorporated by reference herein for all purposes.

TECHNICAL FIELD

The present disclosure relates to capacitive sensor systems.

BACKGROUND

Capacitive sensor devices are often implemented in display application such as touch screens. Different sensing technology using mutual and self capacitive sensing are used to detect a touch position. Further developments provide for non-touching input systems that generate an alternating electric near field and measure distortions of such a field with for example, four electrodes arranged in a frame around a display to determine three-dimensional position data of objects entering the field. Such a system is also known as the GestIC® system and has been developed by the assignee of the present application and a general description is for example disclosed in application note "MGC3130—Sabrewing Single-Zone Evaluation Kit User's Guide", published 2013 by Microchip Technology Inc. which is hereby incorporated by reference. FIG. 8 shows such system with four receiving electrodes A, B, C, D a transmitting electrode 820 arranged under the receiving electrodes A, B, C, D and a controller 810 coupled with the receiving electrodes A, B, C, D and providing an alternating driving signal for the transmitting electrode 820. The controller 810 can provide output signals for a computer system or any other post processing device. Thus the system 800 as shown in FIG. 8 may operate as an input device similar to a computer mouse or a keyboard. The device can be easily integrated within a display, for example by arranging the receiving electrodes A, B, C, D to surround a display screen.

SUMMARY

There exists, however, a need for capacitive sensing systems to gain more sensitivity for the sensor to open the door for applications which require larger sensor size/sensitivity (in particular display applications). According to various embodiments, multiple transmit electrodes with different voltage levels can be used to increase mutual coupling effect and maintaining self sensing effect without overdriving the sensing input.

According to an embodiment, a capacitive sensor system may comprise a receiving electrode having a capacitive coupling to a ground plane or ground electrode, a first transmission electrode arranged between the receiving electrode and the ground plane and having a size with respect to the receiving electrode such that the transmission electrodes covers a surface area of the receiving electrode, and a second transmission electrode arranged adjacent to the receiving electrode and which is not coupled with the first transmission electrode, wherein the second transmission electrode is driven with a higher alternating voltage than the first transmission electrode.

According to a further embodiment, a first and second signal driving said first and second transmission electrode may have the same frequency and may be in-phase. According to a further embodiment, the second transmission electrode can be arranged coplanar with the first transmission electrode. According to a further embodiment, the second transmission electrode can be arranged coplanar with the receiving electrode. According to a further embodiment, the second transmission electrode may at least partially surround the receiving electrode. According to a further embodiment, the second transmission electrode may be arranged below the first transmission electrode. According to a further embodiment, the first transmission electrode can be segmented. According to a further embodiment, the second transmission electrode can be segmented. According to a further embodiment, the second transmission electrode can be larger than the first transmission electrode. According to a further embodiment, the capacitive electrode system may further comprise a controller generating first and second driving signals fed to the first and second transmission electrodes. According to a further embodiment, the capacitive electrode system may further comprise at least one further transmission electrode receiving a voltage different than the first and second transmission electrodes. According to a further embodiment, the second and third transmission electrodes can be arranged coplanar with the receiving electrode, wherein the second transmission electrode at least partially surrounds the receiving electrode, and wherein the third transmission electrode at least partially surrounds the second transmission electrode.

According to another embodiment, a method for operating a capacitive sensor comprising a receiving electrode having a capacitive coupling to a ground plane or ground electrode, a first transmission electrode arranged between the receiving electrode and the ground plane and having a size with respect to the receiving electrode such that the transmission electrodes covers a surface area of the receiving electrode, and a second transmission electrode arranged adjacent to the receiving electrode and which is not coupled with the first transmission electrode, wherein the method comprises the step of driving the second transmission electrode with a higher alternating voltage than the first transmission electrode.

According to a further embodiment of the method, a first and second signal driving said first and second transmission electrode may have the same frequency and may be in-phase. According to a further embodiment of the method, the second transmission electrode can be arranged coplanar with the first transmission electrode or wherein the second transmission electrode is arranged coplanar with the receiving electrode. According to a further embodiment of the method, the second transmission electrode may at least partially surround the receiving electrode. According to a further embodiment of the method, the second transmission electrode may be arranged below the first transmission electrode. According to a further embodiment of the method, the first and/or second transmission electrode can be segmented. According to a further embodiment of the method, the second transmission electrode can be larger than the first transmission electrode. According to a further embodiment of the method, the electrode system may comprise at least one further transmission electrode and the method comprises the step of feeding a voltage different than the voltages for the first and second transmission electrodes to the third transmission electrode. According to a further embodiment of the method, the second and third transmission electrodes can be arranged coplanar with the receiving electrode, wherein the second transmission electrode at least partially surrounds the receiving electrode, and wherein the third transmission electrode at least partially surrounds the second transmission electrode.

According to yet another embodiment, a device may comprise a display; and four electrode groups arranged in a frame fashion around said display, wherein each electrode group may comprise: a receiving electrode having a capacitive coupling to a ground plane or ground electrode, a first transmission electrode arranged between the receiving electrode and the ground plane and having a size with respect to the receiving electrode such that the transmission electrodes covers a surface area of the receiving electrode, and a second transmission electrode arranged adjacent to the receiving electrode and which is not coupled with the first transmission electrode, wherein the second transmission electrode is driven with a higher alternating voltage than the first transmission electrode.

BRIEF DESCRIPTION OF THE DRAWINGS

FIG. 4-7*a* shows sectional views of various embodiments of electrode arrangements;

FIG. 7*b-d* show top views of embodiments according to FIG. 7*a*;

FIG. 8 shows a conventional gesture detection system;

DETAILED DESCRIPTION

The size of GestIC® systems, as for example shown in FIG. 8, is limited to the sensitivity of the receiving electrodes A, B, C, D. According to various embodiments, it is possible to increase the level of the input signal by a factor of three and more and to enable a new field of applications which requires a higher sensitivity of the system. The proposed technique is not limited to GestIC® systems but may be used in all kinds of capacitive measurement systems.

Figure 1:
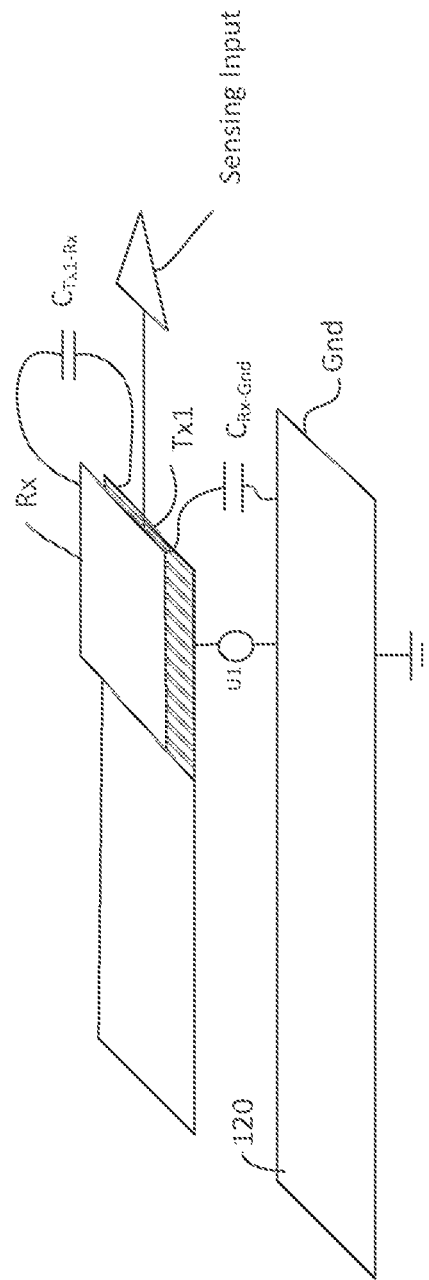
FIG. 1 shows a conventional sensor arrangement.

As shown in FIG. 1, a transmission electrode Tx1 is placed between the receiving electrode Rx and a ground electrode 120. The transmission electrode Tx1 is stimulated with a certain frequency which is received by the receiving electrode Rx. The transmission electrode Tx1 shields the electrode Rx from ground, I other words, it reduces the capacitive coupling $C_{Rx-Gnd}$. The effect will be a reduced base-self capacitance of the Rx electrode. An approach of a human hand will therefore create a larger signal shift (self capacitance measurement). The signal voltage of Tx1 is however limited because high voltage levels will overdrive the sensing input. For mutual capacitance measurements it is beneficial to work with a low base coupling $C_{Tx1-Rx}$ between transmission electrode Tx and receiving electrode Rx. The transmission electrode Tx does not necessarily have to be underneath the receiving electrode Rx. When the base coupling between the Tx and Rx electrodes is low, it is possible to work with higher voltages because the input will not be overdriven easily. Higher voltages for the Tx signal will result in a higher signal shift on the receiving electrode Rx, for example, when a human hand is approaching and shunting the stray field to ground $C_{Hand-Gnd}$.

FIG. 1 shows a conventional transmission electrode Tx wherein the portion underlying the receiving electrode Rx is shown hatched and the remaining portion is not hatched. In particular as shown in FIG. 1, the hatched portion of Tx1 reduces the base coupling $C_{RX-GND}$ and therefore improves the self capacitance measurement. The not hatched portion of Tx1 provides for a straight field for mutual capacitance measurement. The hatched portion of Tx1 has a high coupling to Rx and the Tx signal voltage U1 is limited to avoid overdriving of the signal input. The not hatched portion of Tx would require a high voltage transmitting signal (U1) for optimum mutual capacitance measurement output.

Figure 2:
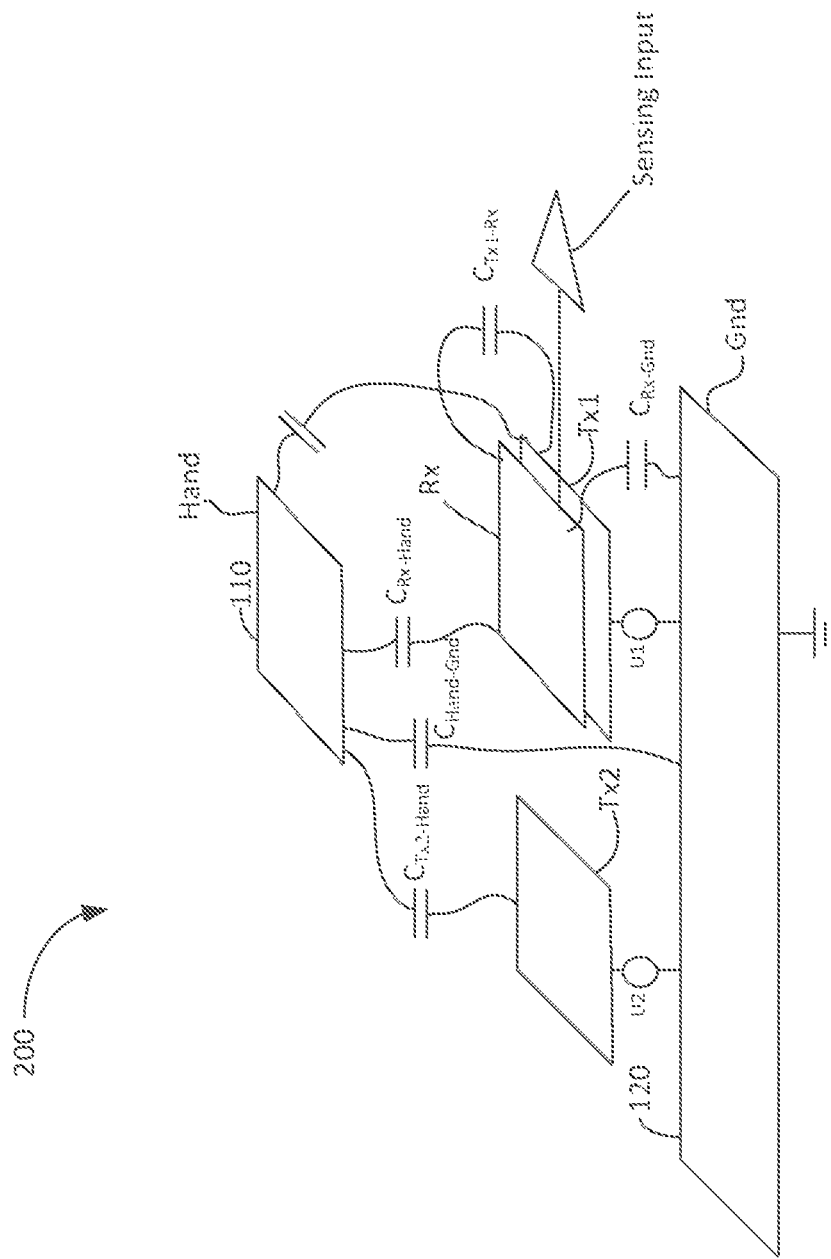
FIGS. 2 and 3 show sensor electrode arrangement according to an embodiment.
Figure 3:
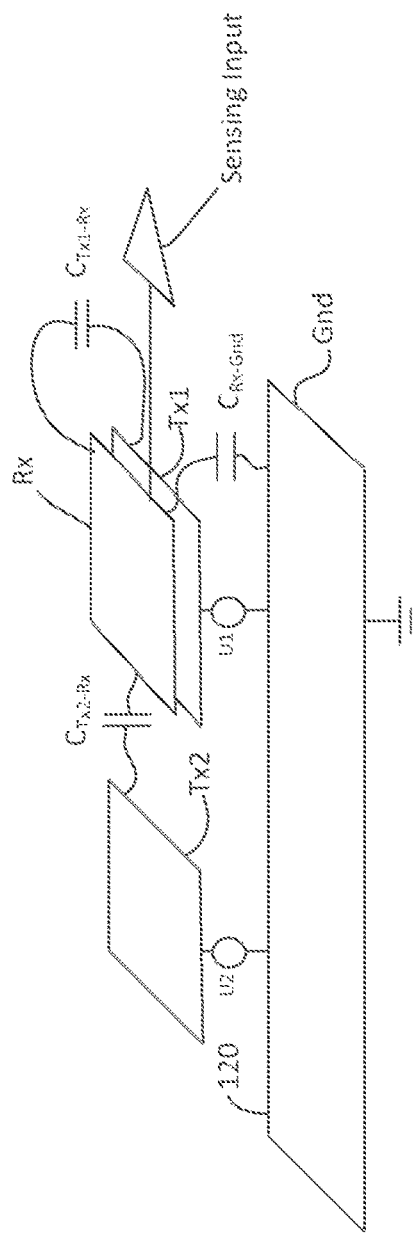

As shown in FIGS. 2 and 3, according to various embodiments, a second transmission electrode Tx2 is introduced which does not shield Rx from ground, in other words, is not arranged between ground electrode 120 and the receiving electrode Rx. This second transmission electrode Tx2 enables the system to optimize the mutual and self capacitance measurement and gain and provide a significant higher overall sensitivity through a higher voltage on transmission electrode Tx2. This higher voltage provides a gain in signal shift with a mutual capacitance measurement. The higher voltage at Tx2 creates no issue with overdriving the Tx1 low voltage and the lower base coupling $C_{Rx-GND}$ from Rx-GND avoids overdriving the input with a high voltage. The sensor is not limited in the number of Rx and Tx sensor channels.

Effectively, the single transmission electrode as shown in FIG. 1 is split in two or more electrode segments, wherein the individual electrode segments are driven by different signals. For example, transmission electrode Tx1 with high coupling to receiving electrode RX ($C_{Tx1-Rx}$) will be driven with a low voltage (U1) to avoid overdriving of the input. Transmission electrode Tx2 has a low capacitive coupling to the receiving electrode Rx ($C_{Tx2-Rx}$) and will be driven with a high voltage (U2) for best mutual effect (no overdriving of the input). The transmission electrode can be split into a plurality of transmission electrodes and the system is not necessarily limited to two transmission electrodes as shown in FIGS. 2 and 3.

According to an embodiment, the first transmission electrode can be driven with a first alternating signal, for example a square wave signal having a first amplitude, for example between 0-20 Volts. The second transmission signal may be derived from the first signal but have a higher amplitude, for example, 6-40 Volts. Thus, according to an embodiment there is no phase shift between the signals and only the amplitude of the two driving signals differs.

The various embodiments make it possible to add 3D gesture detection as an input method to displays with a size of for example 5-17". As mentioned above, the method and system according to various embodiments can also be applied to various other capacitive measurement technologies, for example, it can is valid also in the combination with Microchip's Pcap solution. The various embodiments allow for a combined 2D-3D input solution for larger displays. Also, the sensitivity/detection range of conventional GestIC systems can be enhanced in general.

Figure 4:
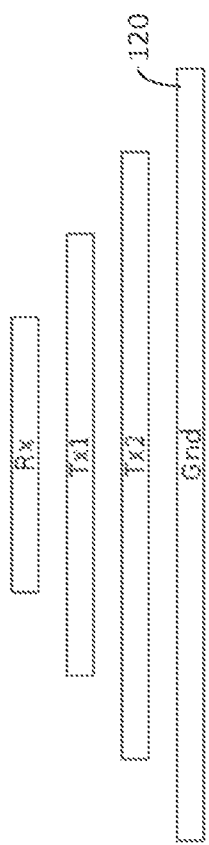

FIG. 4 shows another embodiment in which the transmission electrode segments Tx1, Tx2 are arranged above each other and between the receiving electrode and the ground electrode. Here the first transmission electrode Tx1 which is arranged above the second transmission electrode Tx2 is according to an embodiment smaller in size than the second transmission electrode. Also, the receiving electrode can be smaller than the first transmission electrode according to an embodiment.

Figure 5:
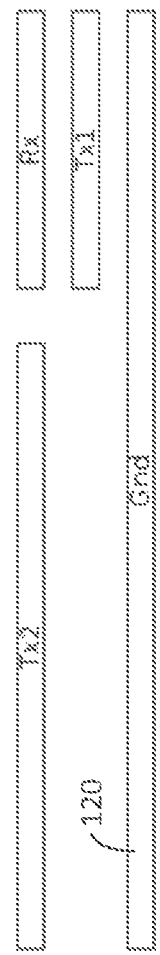

FIG. 5 shows yet another possible embodiment in which only the first transmission electrode Tx1 is arranged between the receiving electrode Rx and the ground electrode 120. The second transmission electrode Tx2 is arranged coplanar with the receiving electrode Rx. Again, according to an embodiment, the first transmission electrode Tx can be smaller in size than the second transmission electrode Tx2.

FIG. 6 shows yet another embodiment, in which again only the first transmission electrode Tx1 is arranged between the receiving electrode Rx and the ground electrode 120. The second transmission electrode Tx2 is however arranged coplanar with the first transmission electrode Tx1. Again, according to an embodiment, the first transmission electrode Tx can be smaller in size than the second transmission electrode Tx2.

FIG. 7a shows yet another embodiment in which three transmission electrodes are provided. Again, only the first transmission electrode Tx1 is arranged between the receiving electrode Rx and the ground electrode 120. The second transmission electrode Tx2 is arranged coplanar with the receiving electrode Rx. The other two transmission electrodes Tx2 and Tx3 are both ring shaped and therefore surround the receiving electrode Tx. FIGS. 7b and 7c show top views possible implementations of the embodiment shown in FIG. 7a. As can be seen, the transmitting electrodes Tx2 and Tx3 do not have to completely surround the receiving electrode Rx. Cut-outs can be provided, in particular if feeding lines are provided in the same layer. Moreover, according to other embodiments, the transmission electrodes Tx2 and/or Tx3 each may be segmented into a plurality of segments, wherein each segment of a transmission electrode receives the same signal as shown in the embodiment of FIG. 7d.

Figure 9:
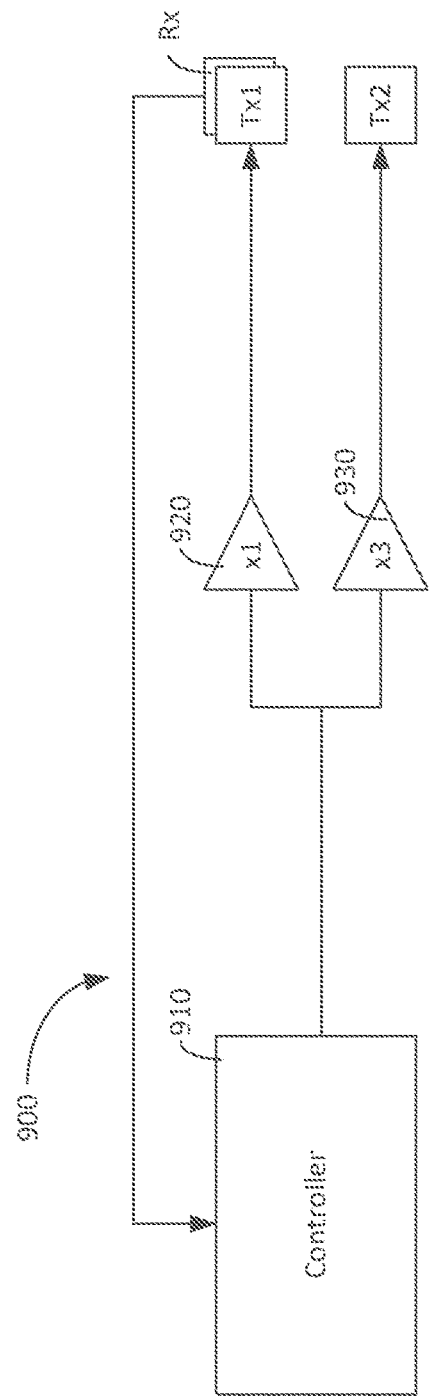
FIG. 9 shows a driving circuit block diagram according to an embodiment.

FIG. 9 shows a block diagram of a sensor circuit 900 with a controller 910 that generates a drive signal such as a square wave signal or a sinusoidal signal that is fed to two amplifier stages 920 and 930. The first amplifier stage may be a buffer stage with a gain of 1 whereas the second stage 930 may gave a gain of 3. Other gain ratios may apply. Thus, two alternating drive signals are generated that differ only in amplitude. These signals are then fed to the first and second transmission electrode, Tx1, Tx2, respectively. The controller may further be configured to receive a signal from an associated receiving electrode Rx. The amplifier stages 920, 930 can be external drivers as shown in FIG. 9 or may be integrated within the controller 910.

Figure 10:
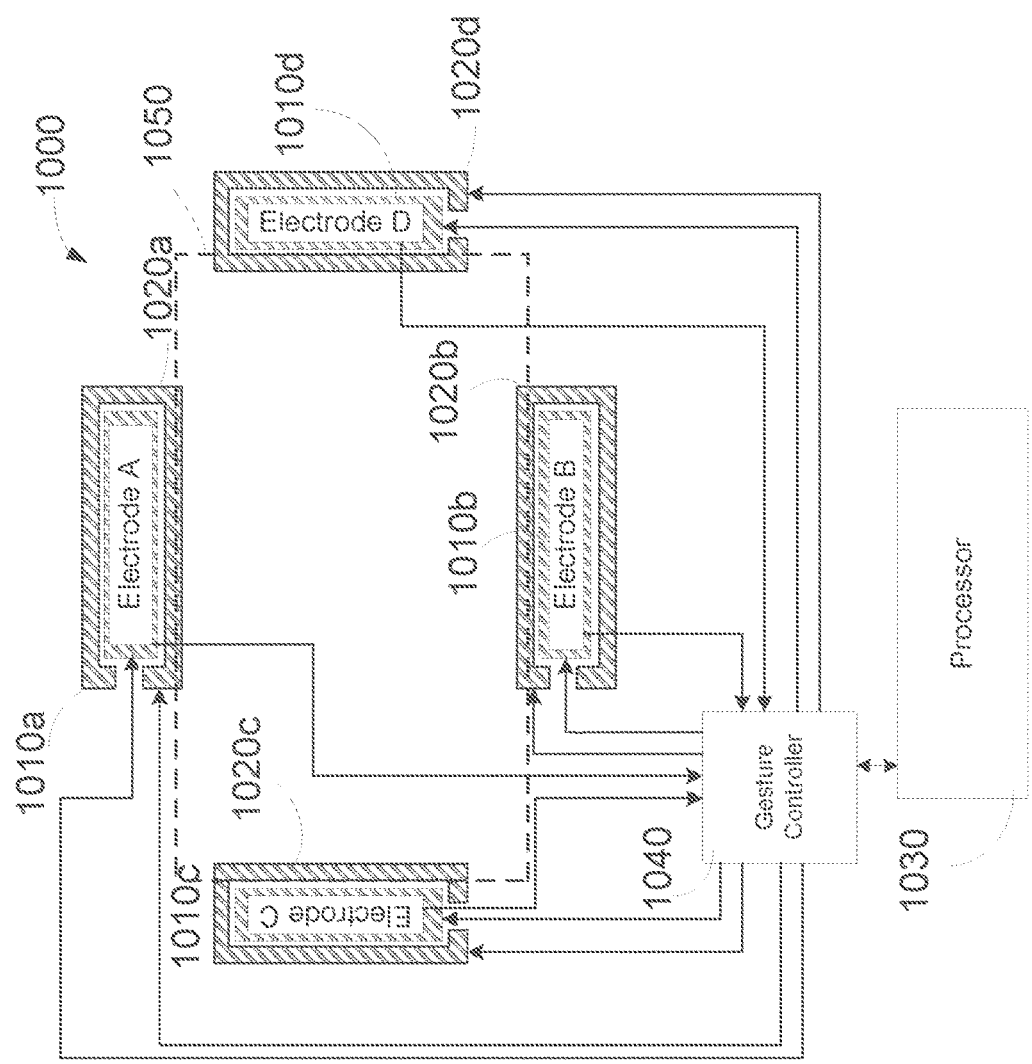
FIG. 10 shows a gesture detection system according to an embodiment.

The system as shown in FIG. 9 may provide drive and reception signals for more than one sensor arrangement. For example, a system as shown in FIG. 8 can be enhanced by providing separate transmission electrodes associated with each receiving electrode A, B, C, D. The transmission electrodes can be arranged with respect to the receiving electrodes A, B, C, D according to any of the embodiments discussed above. FIG. 10 shows a possible implementation of such a system 1000. Similar to the embodiment of FIG. 8, four receiving electrodes A, B, C, and D are arranged in a frame fashion, for example, to surround a display screen 1050. Each receiving electrode A, B, C, D has two associated transmission electrodes 1010a, b, c, d and 1020a, b, c, d, respectively. A gesture controller 1040 provides for the driving signals. According to one embodiment, the first transmission electrodes 1010a, b, c, d may all receive the same alternating signal. Similarly, the second transmission electrodes 1020a, b, c, d may all receive the same signal. However, according to other embodiments, each electrode group may receive a different frequency or phase shifted signal with respect to another group. As further shown in FIG. 10, the first transmitting electrodes have all approximately the same size as the respective receiving electrode or are slightly larger to cover the area of the respective receiving electrode.

The invention claimed is:

1. A capacitive sensor system comprising:
   a receiving electrode having a capacitive coupling to a ground plane or ground electrode,
   a first transmission electrode arranged between the receiving electrode and the ground plane or ground electrode and having a size with respect to the receiving electrode such that the transmission electrodes covers a surface area of the receiving electrode, and
   a second transmission electrode arranged adjacent to the receiving electrode and which is not coupled with the first transmission electrode,
   wherein the first transmission electrode does not extend into an area between the second transmission electrode and the ground plane or ground electrode wherein the second transmission electrode is driven with a higher alternating voltage than the first transmission electrode.

2. The capacitive electrode system according to claim 1, wherein a first and second signal driving said first and second transmission electrode have the same frequency and are in-phase.

3. The capacitive electrode system according to claim 1, wherein the second transmission electrode is arranged coplanar with the first transmission electrode.

4. The capacitive electrode system according to claim 1, wherein the second transmission electrode is arranged coplanar with the receiving electrode.

5. The capacitive electrode system according to claim 4, wherein the second transmission electrode at least partially surrounds the receiving electrode.

6. The capacitive electrode system according to claim 1, wherein the second transmission electrode is arranged below the first transmission electrode.

7. The capacitive electrode system according to claim 1, wherein the first transmission electrode is segmented.

8. The capacitive electrode system according to claim 1, wherein the second transmission electrode is segmented.

9. The capacitive electrode system according to claim 1, wherein the second transmission electrode is larger than the first transmission electrode.

10. The capacitive electrode system according to claim 1, further comprising a controller generating first and second driving signals fed to the first and second transmission electrodes.

11. The capacitive electrode system according to claim 1, further comprising at least one third transmission electrode receiving a voltage different than the first and second transmission electrodes.

12. The capacitive electrode system according to claim 11, wherein the second and third transmission electrodes are arranged coplanar with the receiving electrode, wherein the second transmission electrode at least partially surrounds the receiving electrode, and wherein the third transmission electrode at least partially surrounds the second transmission electrode.

13. The capacitive electrode system according to claim 1, wherein a driving signal for the first transmission electrode has an amplitude between 0-20 Volts and a driving signal for the second transmission electrode has an amplitude between 6-40 Volts.

14. A method for operating a capacitive sensor comprising:

a receiving electrode having a capacitive coupling to a ground plane or ground electrode, a first transmission electrode arranged between the receiving electrode and the ground plane or ground electrode and having a size with respect to the receiving electrode such that the transmission electrodes covers a surface area of the receiving electrode, and a second transmission electrode arranged adjacent to the receiving electrode and which is not coupled with the first transmission electrode, wherein the first transmission electrode does not extend into an area between the second transmission electrode and the ground plane or ground electrode, the method comprising the step of:

driving the second transmission electrode with a higher alternating voltage than the first transmission electrode.

15. The method according to claim 14, wherein a first and second signal driving said first and second transmission electrode have the same frequency and are in-phase.

16. The method according to claim 14, wherein the second transmission electrode is arranged coplanar with the first transmission electrode or wherein the second transmission electrode is arranged coplanar with the receiving electrode.

17. The method according to claim 16, wherein the second transmission electrode at least partially surrounds the receiving electrode.

18. The method according to claim 14, wherein the second transmission electrode is arranged below the first transmission electrode.

19. The method according to claim 14, wherein the first and/or second transmission electrode is segmented.

20. The method according to claim 14, wherein the second transmission electrode is larger than the first transmission electrode.

21. The method according to claim 14, wherein the electrode system comprises at least one third transmission electrode and the method comprises the step of feeding a voltage different than the voltages for the first and second transmission electrodes to the third transmission electrode.

22. The method according to claim 21, wherein the second and third transmission electrodes are arranged coplanar with the receiving electrode, wherein the second transmission electrode at least partially surrounds the receiving electrode, and wherein the third transmission electrode at least partially surrounds the second transmission electrode.

23. The method according to claim 14, wherein a driving signal for the first transmission electrode has an amplitude between 0-20 Volts and a driving signal for the second transmission electrode has an amplitude between 6-40 Volts.

24. A device comprising:

a display; and four electrode groups arranged in a frame fashion around said display, wherein each electrode group comprises:

a receiving electrode having a capacitive coupling to a ground plane or ground electrode, a first transmission electrode arranged between the receiving electrode and the ground plane or ground electrode and having a size with respect to the receiving electrode such that the transmission electrodes covers a surface area of the receiving electrode, and a second transmission electrode arranged adjacent to the receiving electrode and which is not coupled with the first transmission electrode, wherein the first transmission electrode does not extend into an area between the second transmission electrode and the ground plane or ground electrode, wherein the second transmission electrode is driven with a higher alternating voltage than the first transmission electrode.

* * * * *